Aug. 3, 1965 F. B. BARBERA ETAL 3,198,514

DOCUMENT FEEDING SYSTEM

Filed May 10, 1963 4 Sheets-Sheet 1

INVENTORS
FRANK B. BARBERA
WILLIAM A. SUGDEN
BY
ATTORNEY

Aug. 3, 1965 F. B. BARBERA ETAL 3,198,514

DOCUMENT FEEDING SYSTEM

Filed May 10, 1963 4 Sheets-Sheet 3

DOCUMENT FEEDING SYSTEM

Filed May 10, 1963 4 Sheets-Sheet 4

United States Patent Office 3,198,514

Patented Aug. 3, 1965

3,198,514

DOCUMENT FEEDING SYSTEM

Frank B. Barbera and William A. Sugden, Phoenix, Ariz., assignors to General Electric Company, a corporation of New York Filed May 10, 1963, Ser. No. 279,414
3 Claims. (Cl. 271—12)

This invention concerns a document handling system and more particularly concerns a device for supplying only the end document from a stack of documents to a document transporting apparatus.

Electronic and mechanical data processing systems used today in a wide variety of applications frequently utilize document handling systems. Such document handling systems may be, for example, of the type described in U.S. Patent 3,108,694 "System for Collating Documents in Response to Indicia Appearing Thereon" by N. R. Crain et al., issued October 29, 1963 and assigned to the present assignee. The handling system described in the N. R. Crain et al., patent sorts a large number of documents according to information contained on the documents. The information may be, for example, in the form of magnetizable characters, punched holes, or optically readable characters which an automatic reading device is capable of recognizing.

The documents to be processed in the document handling systems are usually stored in a stack containing large numbers of such documents stacked surface-to-surface with each other. The handling systems usually include a transporting apparatus which transports the documents one-by-one, or serially, past the reading device and past one or more operating stations such as sorting stations. The systems thus require apparatus for feeding or supplying the documents serially to the transporting apparatus from the supply stack. Such apparatuses are commonly called document feeding devices or simply feeders.

The physical properties of the documents to be handled may vary from relatively thick but flexible and resilient sheets of material used for punched cards to relatively thin but flexible and resilient sheets of material used for bank drafts or checks.

Flexibility of a document generally increases and the resiliency decreases as a document is increasingly handled, particularly by humans. Thus the resiliency and flexibility properties of the documents in a stack of documents may vary considerably from document to document.

In prior art document feeders the stack of documents is urged toward a moving, forward driving belt. A surface of the foremost document of the stack is urged into direct contact with the forward driving belt and is thereby accelerated toward a document transporting apparatus positioned a short distance away. However, the document immediately behind and next to the foremost document may be adhering to the foremost document for reasons such as for example, dirt, ragged edges of punched holes, or electrostatic attraction. The adhering next document is thus accelerated along with the foremost document into the transporting apparatus.

In order to prevent the adhering next document from being carried into the transporting apparatus by the foremost document a reverse driving belt moving in a direction opposite to the forward driving belt, is positioned against a portion of the forward driving belt through which the accelerating foremost document must past. The coefficient of friction of the reverse driving belt on one surface of a single document positioned between the two belts is less than the coefficient of friction of the forward driving belt on the opposite surface of that document. Hence, the frictional engagement of one surface of the document with the forward driving belt controls and drives the document forward; the other surface of the document merely slips against the reverse driving belt.

When a document adheres to a foremost document the reverse driving belt acts upon a surface of only this adhering document. The coefficient of friction of the reverse driving belt with the surface of the adhering document must be greater than the coefficient of friction between the two adhering documents in order to affectively grip the adhering document, break or shear it away from the foremost document and drive the formerly adhering document rearwardly back into the stacking compartment. Furthermore, the coefficient of friction of the forward driving belt with the surface of the foremost document must be greater than the coefficient of friction between the adhering documents.

However, in such a prior art feeder device the proper balance of friction coefficients is difficult to maintain as the reversing and driving belts wear with usage. In addition, the friction coefficient between adhering documents is not predictable.

It is therefore an object of this invention to provide an improved document feeder for a document handling system.

It is another object of this invention to provide an improved document feeder for a document handling system which may feed intermixed relatively thin and relatively thick documents into the system.

It is a further object of this invention to provide an improved document feeder for a document handling system which will feed only the foremost document of a stack of documents to a document transporting apparatus.

It is still another object of this invention to provide in a document handling system a device for returning to a stack of documents a document adhering to another document fed by a feeding device of the system.

Further objects and advantages of the present invention will become apparent to those skilled in the art to which the invention pertains as the ensuing description proceeds.

The stated objects are realized according to the present invention by providing a feeding device which includes a document accelerating medium; for example, endless forward driving belts continuously moved past a flat or curved face plate. A stack of documents is urged toward the belts such that one surface of the foremost document of the stack of documents is positioned generally parallel with the face plate. Openings provided in the face plate communicate with a source of negative air pressure; i.e., a vacuum. The negative air pressure at the openings provides a pressure differential which urges the foremost document toward the face plate and moving belts.

A document decelerating and reversing means such as, for example, a reverse driving belt moving in a direction opposite to the forward driving belt, is provided at a location downstream (downstream in the direction of movement of the accelerated document) from the stack of documents and offset laterally alongside the path of travel of the accelerating document. The reverse driving belt is positioned adjacent a second face plate which is also provided with openings which communicate with a source of negative air pressure.

When a document adhering to the foremost document that is being accelerated moves past the reverse driving belt, the air pressure differential at the vicinity of the reverse driving belt separates the adhering document from the foremost document and urges it laterally toward the reverse driving belt. The separated document is then driven back into the stack of documents by the reverse driving belt.

The document feeder of the present invention further includes a gate means which is movable between a feeding and a non-feeding position. In the non-feeding position, the gate means prohibits the document from contacting the document accelerating medium or forward driving belt and in the feeding position, documents are allowed to contact the forward driving belt. Thus a means for controlling the feeding of the documents has been provided.

The features of novelty that are considered characteristic of this invention are set forth with particularity in the appended claims. The organization and method of operation of the invention itself will best be understood from the following description when read in connection with the accompanying drawings in which:

Figure 1:
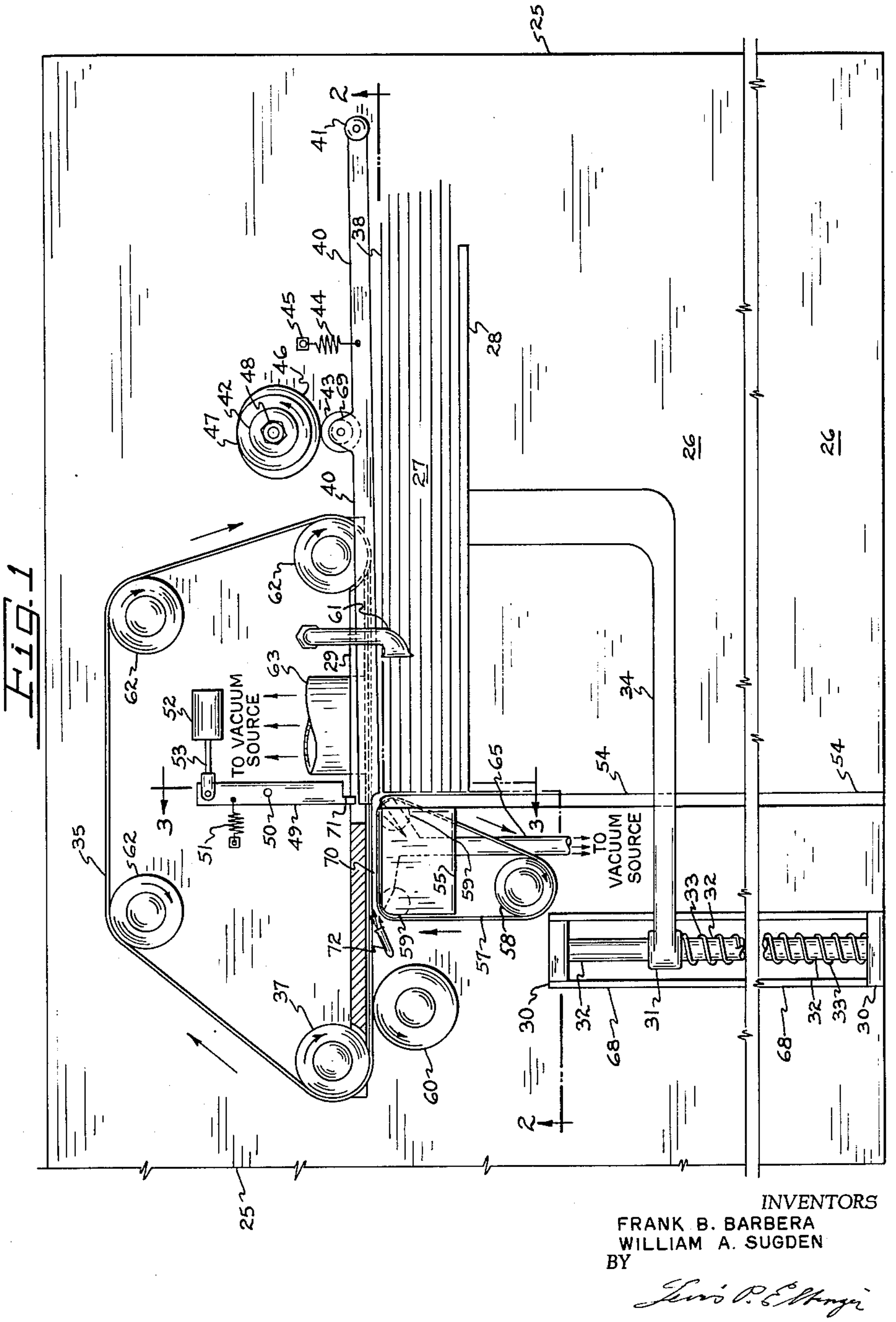
FIGURE 1 is a top elevational view showing details of the present invention.

There is illustrated in FIG. 1 a base 25 for maintaining and supporting the various structural elements of the document feeder in proper operating relationship with each other. A document supply hopper 26 is adapted to store a stack of documents 27 including a foremost or end document 38. A support frame comprising a base portion 68 and two upstanding members 30 is positioned on base 25 at the left-hand side of hopper 26. A bushing support rod 32 is maintained in a horizontal position between members 30. A bushing 31 is slideably mounted on rod 32. A coiled biasing spring 33 is mounted on support rod 32 between the rearward member 30 and the bushing 31. The force of spring 33 urges the bushing in a forward direction. A plate support arm 34 attached to bushing 31 extends upward from bushing 31 and to the right into hopper 26. A document support plate 28 attached to the right-hand end of arm 34 is urged forward by the force of spring 33 acting through arm 34. The plate 28 supports the documents of the stack 27 in an upright position and urges the stack 27 forward toward a feeder plate 29.

Figure 2:
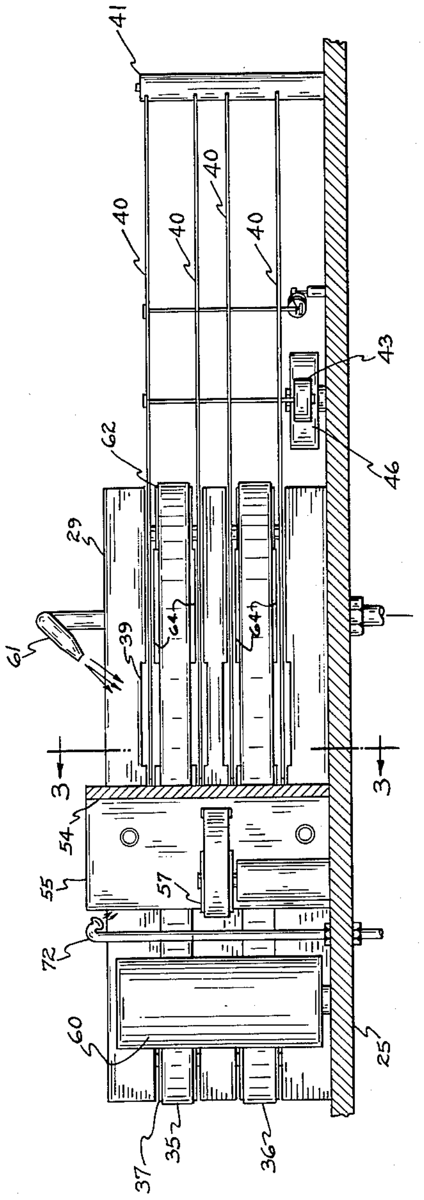
FIGURE 2 is a sectional view along the lines 2—2 of FIG. 1.

Across the entire width of feeder plate 29 runs a document accelerating medium, which in FIGS. 1 and 2 is shown as portions of continuously moving forward driving belts 35 and 36. Each forward driving belt 35 and 36 is positioned about a driving pulley 37 and idling pulleys 62. Driving pulley 37 may be rotated continuously in the clockwise direction by suitably connected rotating means (not shown). The feeder plate 29 is a plane surfaced plate. The inner surface of belts 35 and 36 slide against plate 29. The outer surface of belts 35 and 36 are thus located away from the surface of the plate 29 by a distance equal to the thickness of the belts.

Figure 3:
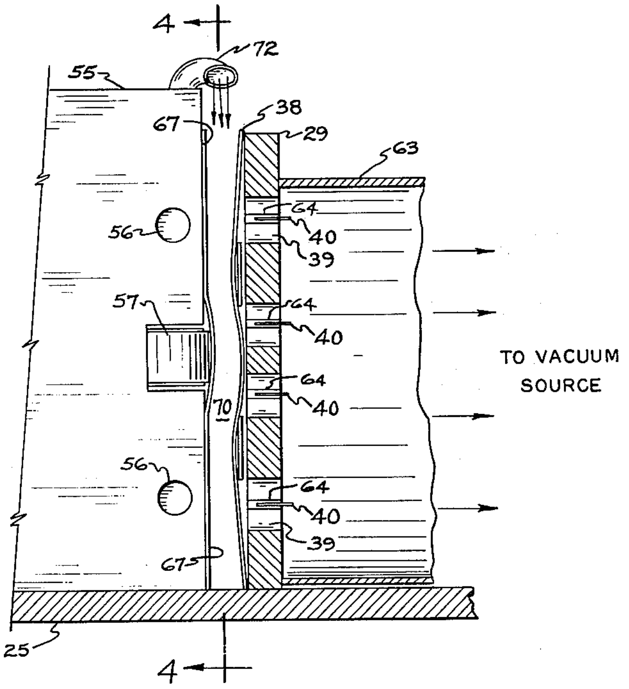
FIGURE 3 is a sectional view along the lines 3—3 of FIGS. 1 and 2 illustrating operation of the present invention.

In order to urge the formost or end document 38 of the stack of the documents 27 toward the feeder plate 29 and belts 35 and 36, and to assist in urging the foremost document 38 into frictional engagement with belts 35 and 36, a series of openings or slots 39 are provided in plate 29. A slot 39 is located immediately above and below each of belts 35 and 36 as illustrated in FIGS. 2 and 3. The slots 39 are coupled with a source of negative air pressure; i.e., a vacuum source, by means of a conduit 63 which communicates between each slot 39 and a vacuum source (not shown).

When the foremost document 38 is frictionally engaged with belts 35 and 36 the edgewise profile of the foremost document 38 is serpentine shaped as illustrated in FIG. 3. This is due to the fact that the force applied normal to the surface of the foremost document by the pressure differential in the vicinity of the slots 39 urges those areas of the document not directly supported by belts 35 and 36 further toward the surface of plate 29. Such a shape imparts or infuses a longitudinal rigidity or stiffness to the document. The document 38 is thus resistant to lateral deflection from straight ahead movement. Further advantages of such a serpentine shape will become more apparent as the description proceeds.

As viewed in FIGS. 1 and 2, a series of movable gate members or fingers 40 are provided for maintaining the stack of documents 27 in a spaced apart relation with the forward driving belts 35 and 36 when it is desired not to feed documents. The fingers 40 are pivoted at one end about a pivot support 41 and extend leftwardly from support 41, through a series of slots 64 provided in the plate 29 to a point past the left side of the slots 39. In FIG. 1, fingers 40 are shown in their normal or non-feeding position. In the non-feeding position the fingers are situated in front of plate 29 and hold the foremost document 38 away from belts 35 and 36. The fingers 40 may be pivoted in the clockwise direction to a document feeding position thereby retracting them into the slots 64. When the fingers 40 are pivoted to their feeding position and behind the front surface of plate 29 the foremost document 38 is brought into contact with belts 35 and 36 by the force of the pressure differential in the vicinity of slots 39. When the foremost document 38 is thus urged into frictional engagement with the forward driving belts 35 and 36 the document is accelerated in the left-hand direction toward a document transporting apparatus.

Proper timing and operational control of the fingers 40 is accomplished by providing a rotatable cam 42. Cam 42 is continuously rotated at a constant speed in synchronism with other elements of the document handling system. A roller type cam follower 43 is attached to the fingers 40 by means of a connecting member 69. A strong spring 44 attached between a spring support 45 and fingers 40 biases the fingers 40 in the feeding position and biases cam follower 43 against cam 42.

The cam 42 is accurately formed to have a specified number of degrees of high surface 46 and low surface 47. When cam follower 43 is following the high surface 46 the fingers 40 are held in their non-feeding position. When the cam follower 43 is following low surface 47, the fingers 40 are in their feeding position. The number of degrees of the cam provided with a low surface 47 determines the percentage of time per revolution of the cam 42 that the fingers 40 are in their feeding position. By means of an adjusting nut 48 the cam 42 may be adjusted and positioned with respect to other rotating elements of the document handling system such that the cam follower 43 may begin to follow the cam's low surface 47 at predetermined times during operation of the document handling system.

Further operational control is provided by a lock which is responsive to an electrical feed signal from an external source for allowing the fingers 40 to move to their feeding position only when desired, rather than during each revolution of cam 42. The lock includes a pivot arm 49 pivoted at approximately its midpoint on a pivot arm support 50. A spring 51 connected between the base 25 and one end of pivot arm 49 biases the arm in the counterclockwise direction. An electrically operated solenoid 52 is mounted approximately opposite spring 51. An armature 53 of the solenoid is coupled to the pivot arm 49 near the spring attachment point. When the solenoid is not energized the biased pivot arm 49 pulls or holds the armature 53 in its outward or non-energized position as shown in FIG. 2. When the solenoid is energized by an electrical feed signal the armature 53 is retracted to the right thereby overcoming the force of spring 51 and thus pivoting arm 49 a few degrees in the clockwise direction.

When the solenoid 52 is not energized and the fingers 40 are in their non-feeding position the left-hand tips of the fingers 40 are biased against an end of the pivot arm 49 by the force of spring 44. Thus when the low surface 47 of the cam 42 is presented to the cam follower 43 the fingers are prohibited or prevented from being moved to their feeding position; the fingers are thus locked in their non-feeding position.

When it is desired to feed the foremost document 38 of the stack of documents 27, an electrical feed signal is applied to the solenoid 52 at some instant of time during which the high surface 46 of cam 42 is adjacent the cam follower 43; the electrical signal is maintained until some time after cam follower 43 is following the low surface 47 of the cam 42.

Figure 5:
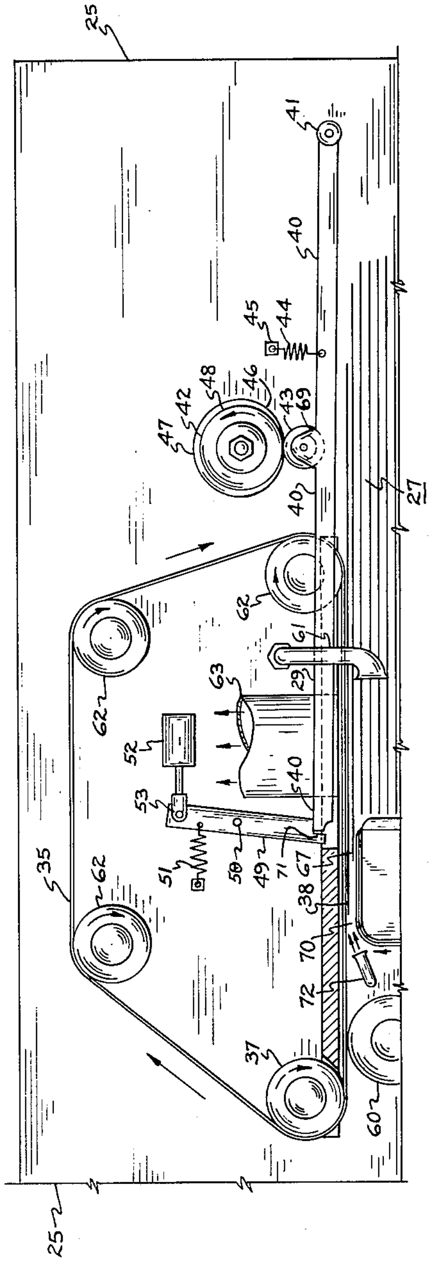
FIGURE 5 is a top elevational view of the present invention illustrating operation thereof.

As illustrated in FIG. 5 when the solenoid 52 is thus energized the arm 49 is pivoted in the clockwise direction thereby moving the end of the arm 49 away from the left-hand tips of the fingers 40; the fingers are free to move to their feeding position which they do as the cam follower 43 follows the low surface 47 of the cam 42. The left-hand tips of fingers 40 rest in a notch 71 at the outer end of arm 49. While the cam follower 43 is following the low surface 47 of the cam 42 the electrical signal may be removed from the solenoid 52. The arm 49 is thus attempted to be moved back to its former locking psition by the force of spring 51. However, at this time the left-hand tips of the fingers are alongside the notch 71 at the outer end of the arm 49. The arm 49 merely rests against the left-hand tips of fingers 40.

As the cam 42 continues its rotation the high surface 46 is presented to the cam follower 43 and causes the fingers to be moved or pivoted to their non-feeding position. As the fingers are thus pivoted to their non-feeding position their left-hand tips are moved out of notch 71. The pivot arm 49 thus is free to be urged or moved back into its finger locking position by the force of spring 51.

Thus a means for controlling the movement of the fingers 40 has been provided. If desired successive foremost documents of the stack 27 may be fed one after another with each rotation of the cam 42 by merely maintaining a continuous electrical signal power on the solenoid 52 as long as desired.

While there has been shown cam timing and operation of the fingers 40, other suitable devices such as torque motors or solenoids, plus associated controls, may be used to move the fingers 40 when desired. It should be noted that when feeding documents rapidly with each revolution of cam 42 the beating action of the fingers tends to maintain the stack of documents 27 rearwardly a short distance in hopper 26. When the fingers 40 are moved to their feeding position, pressure along the entire length of the foremost document is suddenly relieved. The foremost document 38 is thus readily separated from the next document in the stack 27.

Figure 4:
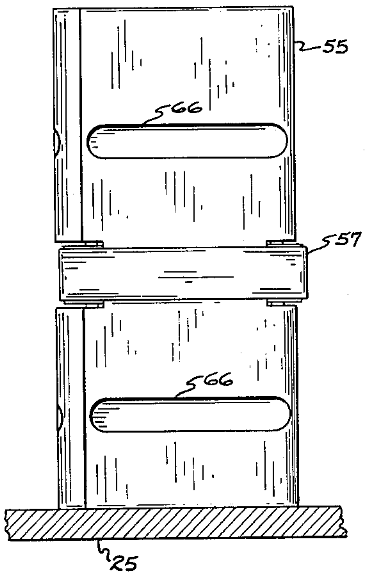
FIGURE 4 is a sectional view along the lines 4—4 of FIG. 3 illustrating a detail of the present invention.

The present invention resides in further apparatus, now to be fully described, used in combination with the previously described feeding apparatus, for assuring that only the foremost document 38 is fed by a document feeding device. At the left of the supply hopper 26 is mounted a document leading edge plate 54, as illustrated in FIGS. 1 and 2. At the forward end of the plate 54 is a leading edge vacuum block or member 55. Block 55 is separated from the forward driving belts 35 and 36 by a space 70. As shown in FIG. 3 several openings or ports 56 are provided in the block near the forward corner adjacent the hopper 26. Elongated ports 66 are also provided in block 55 directly opposite plate 29 as shown in FIG. 4. Communication between the ports 56, elongated ports 66 and a source of a continuous negative air pressure is provided.

Vacuum applied to the ports 56 creates a pressure differential which causes a flow of air toward ports 56. The flow of air urges the first several documents in the stack 27 toward the side of the block 55 that is adjacent the hopper 26. This urging of the first several forward most documents against the block 55 places the leading edge of the foremost document 38 in a precise location prior to being urged into frictional contact with the forward driving belts 35 and 36.

A portion of a continuously moving reverse driving belt 57 is positioned across the forward surface of block 55 and between two elongated ports 66. The reverse driving belt 57 is driven by a driving pulley 58 and positioned about idling pulleys 59. The direction of rotation of pulley 58 is clockwise thereby moving belt 57 in direction exactly opposite to the movement of those portions of forward driving belts 35 and 36 running across plate 29.

When only the foremost document 38 is accelerated in a path of travel toward the left into the space 70 separating plate 29 from block 55 the document 38 is subjected to the air pressure differential in the vicinity of ports 66. However, since the accelerating foremost document 38 is deformed or curved to a configuration infusing a resistance to forces acting normal to its surface the deformed accelerating document continues in a straight ahead path of travel. Since the accelerating foremost document 38 is nowhere in contact with reverse driving belt 57, that belt has no effect on the document 38.

Reference is now directed to FIGS. 3 and 5. If, at the time the foremost document 38 is brought into frictional engagement with the accelerating belts 35 and 36, and the next document in the stack for various reasons adheres to the foremost document 38, an adhering next document 67 will be carried along with the accelerating foremost document 38 into the space 70. As this occurs, the thus carried along next document 67 is subjected to the air pressure differential in the vicinity of ports 66. The air pressure differential attracts the adhering next document 67 laterally away from the accelerating foremost document 38 and toward the block 55. It is to be recalled that the foremost document 38 being accelerated is stiffened and thus resists following the next document 67 laterally toward the reverse driving belt 57 adjacent block 55. Thus the accelerating foremost document 38 and the adhering next document 67 are laterally separated from each other as they enter the space 70. As the separated next document 67 frictionally engages with reverse driving belt 57 it is driven in the reverse direction back into the hopper 26 where it is then the new foremost document of the stack of documents 27. If more than one adhering document is carried into the space 70 by the accelerating foremost document 38, action similar to that just described will take place to separate and drive first, the document nearest the ports 66 back into the stack 27 and then the next nearest document etc.

The fingers 40 are returned to their non-feeding position a short time after the foremost ducument 38 is begun to be accelerated. This time is sufficient for the accelerating foremost document 38 to be gripped at a point in its path of travel between a portion of the belts 35 and 36, and an adjacent pinch roller 60. Thus when the fingers 40 are returned to their non-feeding position thereby disengaging the rearward portion of the foremost document 38 from the forward driving belts 35 and 36 the document 38 is continued to be urged further toward a transporting apparatus which may be located at the left of the described feeding device. The document 67 driven rearwardly back into the hopper 26 by reverse driving belt 57 is thus prevented from coming in contact with the forward driving belts 35 and 36.

There has thus been shown a document feeding device utilizing document reversing apparatus for, under normal conditions of operation, providing that only the foremost document of a stack of documents is fed from the feeder.

However, since the forces causing documents to adhere to one another are generally unpredictable the present invention incorporates additional features to insure separation of adhering documents. As shown in FIGS. 1 and 5 an air nozzle 61 is directed downwardly from a point directly above the forward first several documents in the stack 27. The nozzle 61 is coupled with a source of positive air pressure (not shown). Air emerging from nozzle 61 is forced between the first several documents and thus tends to maintain the first several documents of the stack 27 away from each other. The air emerging from nozzle 61 tends to hold the foremost document 38 firmly against the fingers 40 and to hold the next document 67 away from the foremost document 38. As the fingers 40 are moved to their feeding position the air emerging from the nozzle 61 aids the pressure differential at the vicinity of ports 39 in urging the foremost document 38 into frictional engagement with forward driving belts 35 and 36. Also, air emerging from the nozzle 61 has a general movement or flow toward the ports 56 of block 55. This general downstream flow of air aids the air pressure differential at the vicinity of ports 56 in moving the forward first several documents so that their leading or forward edges are adjacent the block 55 just prior to being fed by the feeding device.

As an additional aid in insuring separation of an adhering document in the space 70, there is provided an air nozzle 72 positioned at a point somewhat downstream of the block 55 and aimed toward the plate 29 as illustrated in FIG. 3. Air nozzle 72 is also connected with a source of positive air pressure (not shown). Since a single document (the foremost document) being accelerated and passing through the space 70 is deformed, as mentioned previously, some of the air emerging from nozzle 72 enters behind the foremost document 38 and some air passes or presses against its other or outer surface. The balance of air pressure forces plus the stiffness of the deformed foremost document 38 avoids lifting of the foremost document 38 from frictional engagement with belts 35 and 36.

However, when a document 67 adhering to the foremost document 38 enters into space 70 the air emerging from nozzle 72 enters between the two documents 67 and 38 thereby tending to separate them and further urging the separated document 67 into frictional contact with the reverse driving belt 57.

While the principles of the invention have been made clear in the illustrative embodiments, there will be obvious to those skilled in the art, many modifications in structure, arrangement, proportions, the elements, materials and components, used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. An apparatus for supplying the foremost document of a stack of documents to a transporting medium in response to a signal, said apparatus comprising: a continuously energizable document accelerating medium for accelerating said foremost document in a path of travel toward said transporting medium; means urging said stack of documents toward said accelerating medium; a gate means movable between a feeding position and a non-feeding position, wherein said foremost document is contactable with said accelerating medium when said gate means is in said feeding position and wherein said foremost document is non-contactable with said accelerating medium when said gate means is in said non-feeding position; gate operating means normally holding said gate means in said non-feeding position, said gate operating means responsive to said signal for moving said gate means to said feeding position and for subsequently returning said gate means to said non-feeding position; means for urging said foremost document into contact with said accelerating medium; document reverse driving means offset laterally from said path of travel; a means for separating from said end document in said path of travel a second document adhering to said foremost document and for urging said second document into contact with said reverse driving means; said reverse driving means driving said second document in contact therewith into said stack of documents.

2. An apparatus for supplying solely the end document of a stack of documents to a transporting medium in response to a signal, said apparatus comprising: moving belts for accelerating said end document in a path of travel to said transporting medium when said end document is in contact with said belts; means biasing said stack of documents toward said belts; gate members rotatable between a first position and a second position, wherein said gate members are between said end document and said belts when in said first position, and wherein said belts are between said end document and said gate members when said gate members are in said second position; locking means normally maintaining said gate members in said first position, said locking means responsive to said signal for rotating said gate members to said second position and for subsequently returning said gate members to said first position; first vacuum means for placing said end document in contact with said belts when said gate members are in said second position, said vacuum means infusing a configuration to said end document wherein said end document is longitudinally stiffened and resistant to lateral deflection from said path of travel; a reverse driving belt spaced apart from said path of travel for returning to said stack of documents a second document which may be carried into said path of travel by contact with said end document; second vacuum means for laterally separating said second document from said end document in said path of travel and for placing said second document thereby separated into operative contact with said reverse driving belt.

3. An apparatus for supplying the end document of a stack of documents to a document transporting medium in response to a signal, said apparatus comprising: storage means for storing said stack of documents; aligning means for placing said end document of said stack of documents at a substantially precise location in said storage means; a moving belt for accelerating said end document in a path of travel toward said transporting medium; means for urging said stack of documents toward said moving belt; a first member positioned adjacent the side of said belt opposite said stack of documents, said member being provided with first openings above and below said belt; means providing a negative air pressure at said first openings for urging said end document into operative contact with said moving belt; a gate means movable between a feeding position and a non-feeding position, wherein said gate means prevents operative contact of said end document with said belt when in said non-feeding position and wherein said gate means permits said end document to be in operative contact with said belt when in said feeding position; gate operating means normally holding said gate means in said non-feeding position, said operating means responsive to said signal for moving said gate means to said feeding position and subsequently returning said gate means to said non-feeding position; a second member provided with second openings, said second member positioned laterally of said path of travel; a portion of a moving reverse driving belt positioned between said second member and said path of travel; means providing a negative air pressure at said second openings, said negative air pressure providing an air pressure differential for separating from said end document in said path of travel a second document carried into said path of travel by contact with said end document, said air pressure differential further urging said second document thereby separated into frictional engagement with said reverse driving belt; said reverse driving belt moving said second document engaged therewith to said substantially precise location.

References Cited by the Examiner

UNITED STATES PATENTS

| | | | |
|---|---|---|---|
| 2,792,218 | 5/57 | Van Marle. | |
| 3,067,998 | 12/62 | Cattorini et al. | 271—28 X |
| 3,103,355 | 9/63 | Hubbard et al. | 271—34 X |
| 3,126,199 | 3/64 | Rosoff | 271—12 |

M. HENSON WOOD, Jr., *Primary Examiner.*

RAPHAEL M. LUPO, ROBERT B. REEVES, *Examiners.*